(12) United States Patent
Setton

(10) Patent No.: US 8,738,714 B2
(45) Date of Patent: May 27, 2014

(54) SUGGESTING INVITATIONS TO JOIN A NETWORK

(75) Inventor: Eric Setton, Palo Alto, CA (US)

(73) Assignee: TangoMe, Inc., Mountain View, CA (US)

( * ) Notice: Subject to any disclaimer, the term of this patent is extended or adjusted under 35 U.S.C. 154(b) by 113 days.

(21) Appl. No.: 13/184,706

(22) Filed: Jul. 18, 2011

(65) Prior Publication Data

US 2013/0024506 A1 Jan. 24, 2013

(51) Int. Cl.
*G06F 15/16* (2006.01)

(52) U.S. Cl.
USPC .......................... 709/206; 709/224; 709/228

(58) Field of Classification Search
USPC .................. 709/204, 206, 223, 224, 227, 228
See application file for complete search history.

(56) References Cited

U.S. PATENT DOCUMENTS

| 7,805,406 B2* | 9/2010 | Craig ............................ 707/622 |
| 8,010,602 B2* | 8/2011 | Shen et al. .................... 709/204 |
| 8,510,383 B2* | 8/2013 | Hurley et al. ................. 709/205 |
| 2007/0053335 A1* | 3/2007 | Onyon et al. ................. 370/338 |
| 2009/0171979 A1* | 7/2009 | Lubarski et al. .............. 707/10 |
| 2010/0049852 A1 | 2/2010 | Whitnah et al. |
| 2010/0241719 A1* | 9/2010 | Agundez Dominguez et al. ............................ 709/206 |
| 2010/0299276 A1 | 11/2010 | Shahine et al. |
| 2010/0317322 A1 | 12/2010 | Underwood et al. |
| 2011/0196695 A1* | 8/2011 | Ye et al. ............................. 705/2 |
| 2012/0185291 A1* | 7/2012 | Ramaswamy et al. ....... 705/7.19 |
| 2013/0024513 A1* | 1/2013 | Sacks et al. ................... 709/204 |

FOREIGN PATENT DOCUMENTS

KP 20090028891 3/2009

OTHER PUBLICATIONS

"International Search Report PCT/2012/046323", Mailed Jan. 28, 2013, 9 pages.

* cited by examiner

*Primary Examiner* — Viet Vu

(57) ABSTRACT

A method for suggesting invitations to a network. The method includes accessing information corresponding to a plurality of individuals, wherein a first user of the network is associated with the plurality of individuals. The method also includes determining whether any of the plurality of individuals merit an invitation to join said network with the first user. The determining is based on the information corresponding to a plurality of individuals.

14 Claims, 3 Drawing Sheets

SUGGESTING INVITATIONS TO JOIN A NETWORK

BACKGROUND

In computing network environments a user is able to communicate with other individuals via the services of the computing network environment. Oftentimes the user interacts with a limited number of individuals in which the user has a close relationship with. If the individuals are not currently registered with the service, then the likelihood that they will be active users of the service is reduced.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In communication services (e.g., mobile video calling services), the users of the service usually interact with a limited number of people that they are particularly close to (e.g., spouse, parents, children, etc.). If the people (e.g., spouse, parents, children) are not registered on the system, then the likelihood that they will be active users of the mobile calling services is reduced.

Accordingly, the discussion below will describe how to increase the likelihood that the people will register with the communication service by suggesting, to the user, a list of individuals to invite to use the service.

In particular, the following discussion will first describe the structure and components of system 100. Then the discussion will describe the functionality of the structure and components of system 100 during use of system 100.

Figure 1:
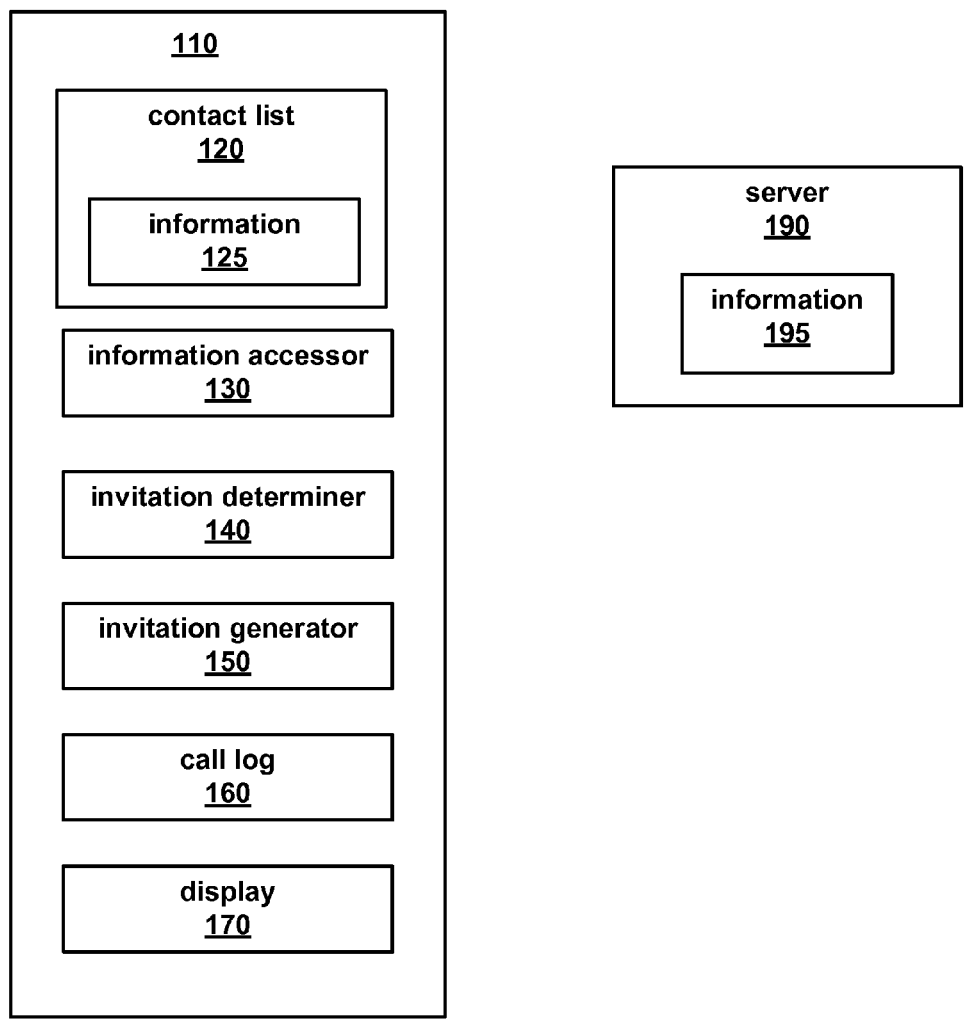
FIG. 1 illustrates an example of a device, in accordance with an embodiment of the present invention.

FIG. 1 depicts system 100 comprising device 110 and optionally, server 190. System 100 is any network or communication system that allows individuals to communicate with one another. For example, system 100 can be a mobile device system, a mobile video calling service, etc.

Device 110 is any device that is able to facilitate in the communication between users in system 100. For example, device 110 can be, but is not limited to, a personal computer (PC), smart phone, personal digital assistant (PDA), cell phone, hand-held mobile device, any computing device configured for video conferencing between users, etc. In one embodiment, user 105 communicates with another individual through system 100 via device 110.

System 100 (in particular, device 110) includes, contact list 120, information accessor 130, invitation determiner 140, invitation generator 150, call log 160 and display 170.

In various embodiments, device 110 includes some or none of components 120-160. For instance, some or all of components 120-160 are disposed in another device, such as a server 190.

Contact list 120 is a collection or list of names of individuals. In other words, contact list 120 is an address book for user 105. For example, contact list 120 can include, but is not limited to friends, neighbors, employer, coworkers, relatives of user 105.

Contact list 120 can be utilized to form social network or social graph of user 105. In general, a social graph describes the relationships between individuals.

In one embodiment, contact list 120 is a global contact list. For instance, the global contact list includes information associated with a plurality of individuals listed in the global contact list. The global contact list can be associated with social graphs, social network site, employer, peers, social groups, educational institutions, etc.

Information 125 is any information corresponding to or associated with the individuals listed in contact list 120. Information 125 can be any personally identifiable information. Information 125 can be, but is not limited to, first and last name, phone numbers, email address, Facebook ID, screen name, street address, etc. Moreover, information 125 can be any addressable information that facilitates in allowing information to be sent to and received individuals in the contact list.

In one embodiment, contact list 120 is accessible to system 100. For example, user 105 allows system 100 access to contact list 120.

Information accessor 130 is configured to access information (e.g., information 125) corresponding to individual listed in contact list 120.

In one embodiment, information accessor 130 is also configured to access information corresponding to user 105. The information corresponding to user 105, can be, but is not limited to, first and last name, phone numbers, email address, Facebook ID, screen name, street address, etc. This information can be provided by the user when registering, logging into or prompted by system 100.

Invitation determiner 140 is configured for determining whether any of the individuals listed in contact list 120 merits an invitation to join network 100 with user 105, based on information 125.

Invitation generator 150 is configured for generating suggested invitations to network 100. For example, invitation generator 150 is configured for generating a list of suggested users to invite to use the services of network 100.

Call log 160 is configured for storing information about the communication between user 105 and other individuals. For example, any information corresponding to placed and received calls, such as, but not limited to, length of call, time of call, and area of call.

Display 170 is configured for displaying information to user 105.

Figure 2:
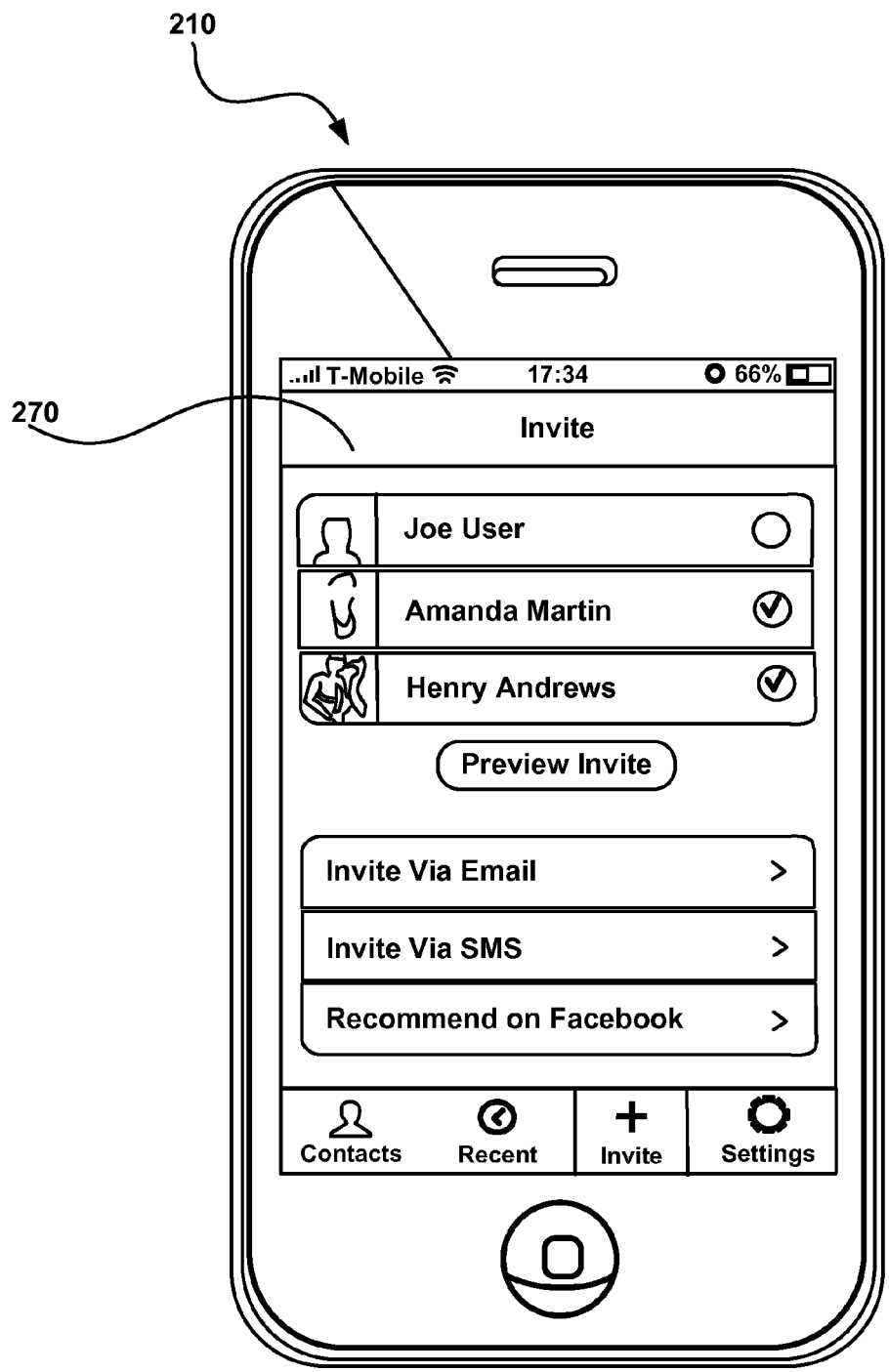
FIG. 2 illustrates an example of a device, in accordance with an embodiment of the present invention.

The discussion will now describe the functionality of the structure and components of system 100 during use of system 100. In particular, the discussion will describe suggesting invitations to join a network (e.g., a mobile video calling service). The discussion will refer to FIGS. 1 and 2. FIG. 2 depicts an embodiment of device 210, which is similar to device 110.

In various embodiments, user 105 communicates with individuals (e.g., spouse, parents, children, etc.) through system 100 via device 110. For instance, user 105 is a registered user of a mobile video calling service of system 100. As such, user 105 is able to video call some or all of the individuals on contact list 120.

In some embodiments, individuals listed on contact list 120 may not be a registered user of the mobile video calling service. As such, components in system 100 are utilized to facilitate in increasing the likelihood that individuals listed in contact list 120 will register with the mobile video calling service.

Accordingly, information accessor 130 accesses information 125 of contact list 120. It is noted that contact list 120 is the contact list of user 105. In one embodiment, information accessor 130 accesses information corresponding to user 105, such as, name, phone number, country, email address, and Facebook ID.

Invitation determiner 140 determines whether any of the individuals listed in contact list 120 merits an invitation to join the mobile calling service. The determination is based on information 125 corresponding to the individuals.

The determination can be accomplished in a variety of ways. In general, an individual merits an invitation if the individual is a relevant contact with respect to user 105. In some embodiments, a relevant contact of user 105 is an individual with whom user 105 typically interacts with via the mobile video calling service. A highly relevant contact can be individuals with whom user 105 has a close relationship with such as a spouse, parent, children, best friend, etc.

An individual can be a relevant contact based on a last name. For example, if the last name of user 105 is Smith and the last name of an individual in contact list 120 is also Smith, then the individual(s) with the last name of Smith in contact list 120 may merit an invitation to join the mobile calling service.

In another example, individuals designated as "favorites," or the like, in contact list 120 may merit invitation to join the mobile video calling service.

Call log 160 can be utilized to facilitate in determining whether any of the individuals listed in contact list 120 merits an invitation to join the mobile video calling service. For example, individual(s) who are called often by user 105, or who often call user 105, may merit invitation to join the mobile calling service. In another example, individuals who have long phone conversations with user 105 may merit invitation to join the mobile calling service.

Various other metrics or thresholds, derived from call log 160, can be utilized to determine whether any of the individuals listed in contact list 120 merits an invitation to join the mobile calling service. For example, such metrics/thresholds, may include time of call, various calling patterns, area code of calls made and/or received, country of calls made and/or received, and the like.

In response to determining whether at least one individual merits an invitation to join the mobile calling service, invitation generator 150 generates suggested invitations to the mobile calling service. For example, if Individuals A and B are deemed to merit an invitation to join the mobile calling service, then invitation generator 150 generates suggested invitations of Individuals A and B. In other words, invitation generator 150 generates a suggested list of users, which includes Individuals A and B, to be invited to join the mobile calling service.

The suggested list of invitations can be presented to user 105 in a variety of ways. For example, user 105 can receive a transactional email (e.g., welcome emails to the service), promotional emails (e.g., newsletters, announcements, etc.).

In one embodiment, the suggested list of users to invite is presented via a mobile application. For example, referring to FIG. 2, the suggested invitations are presented on display 170. In particular, Joe User, Amanda Martin and Henry Andrews (who were determined to merit an invitation to join the mobile video calling service) are presented on display 270 of device 210.

In such an embodiment, user 105 is presented with an option to select the "Preview Invite," within the "Invite" tab. When the "Preview Invite" option is selected, the list of suggested invitations is presented on display 270.

Additionally, in one embodiment, user 105 is provided the option to choose which of the individuals are to be invited. As depicted in FIG. 2, Amanda Martin and Henry Andrews are selected. Accordingly, they will be sent an invitation.

Invitations are sent in a variety of ways. Invitations can be sent via email, Short Message Service (SMS), or a social networking site (e.g., Facebook). For example, FIG. 2 depicts user 105 presented with the options of "Invite via Email," "Invite via SMS," and "Recommend on Facebook."

Figure 3:
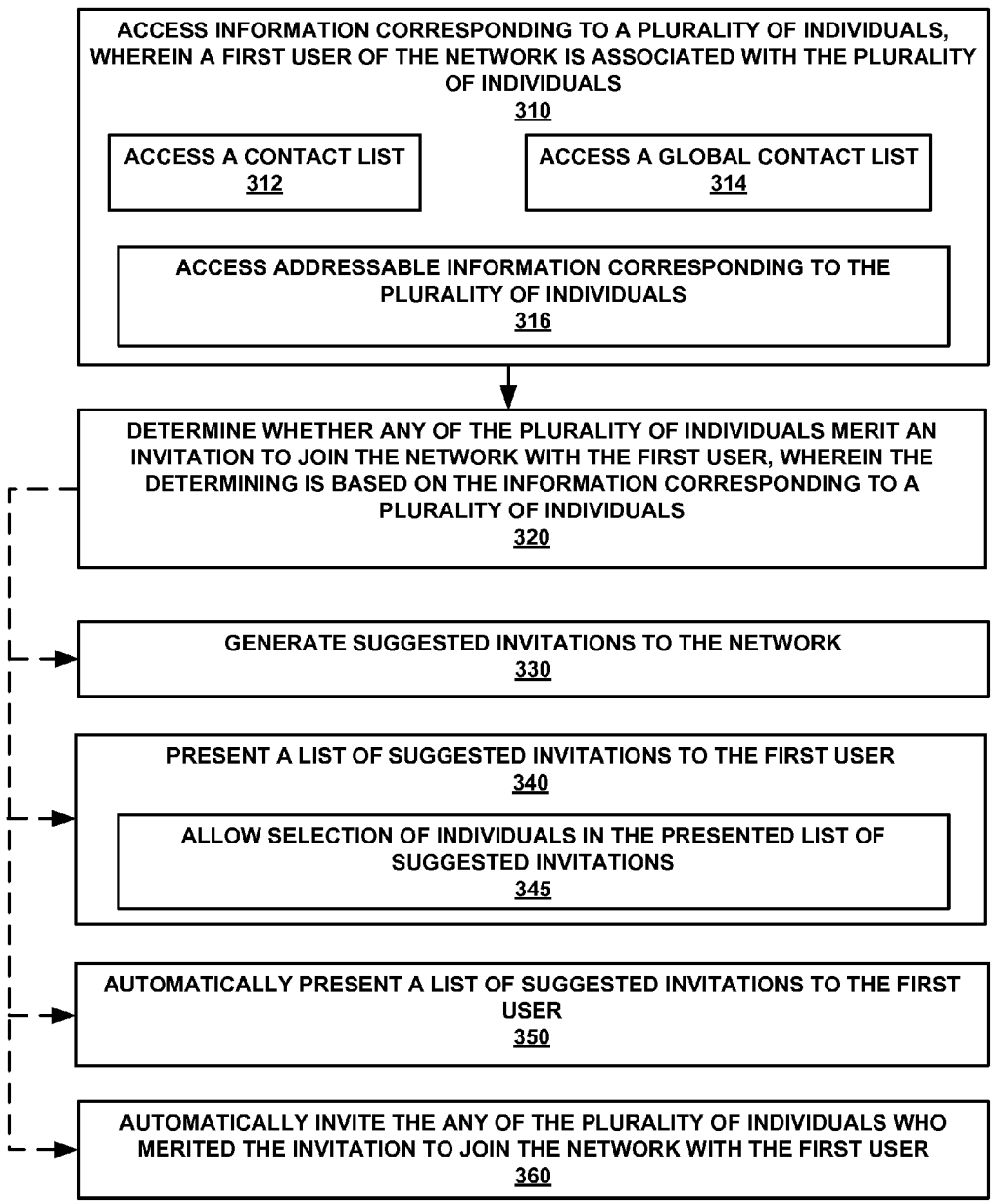
FIG. 3 illustrates an example of a flow chart of a method for suggesting invitations to join a network, in accordance with an embodiment of the present invention.

FIG. 3 depicts an embodiment of method 300 for suggesting invitations to join a network. In various embodiments, method 300 is carried out by processors and electrical components under the control of computer readable and computer executable instructions. The computer readable and computer executable instructions reside, for example, in a non-transitory data storage medium such as computer usable volatile and non-volatile memory. However, the computer readable and computer executable instructions may reside in any type of computer readable storage medium. In some embodiments, method 300 is performed by components in system 100, as described in FIGS. 1 and 2.

At 310 of method 300, information corresponding to a plurality of individuals is accessed, wherein a first user of the network is associated with the plurality of individuals.

In one embodiment, at 312, contact list 120 of user 105 is accessed. In another embodiment, at 314, a global contact list is accessed. In a further embodiment, at 316, addressable information (e.g., email address, Facebook ID, screen name, street address, etc.) corresponding to the plurality of individuals is accessed.

At 320, it is determined whether any of the plurality of individuals merits an invitation to join the network with the first user, wherein the determining is based on the information corresponding to a plurality of individuals. For example, invitation determiner 140 determines whether any of the individuals listed in contact list 120 merits an invitation to join a mobile calling service with user 105. In such an example, invitation determiner 140 analyzes information 125 (e.g., personal identification information) to facilitate in determining which contacts in contact list 120 are the most relevant contacts and thus, merit an invitation to join the network with user 105.

In various embodiments, the determining is based on call logs or information derived from call logs. For example, it is determined that individuals in a distant area code or in a different country than user 105 merit an invitation to join the network. The network can be a free mobile video calling service that is utilized via a mobile application. As a result, the user 105 and the individuals a long distance away from user 105 can communicate for free over the mobile video calling service.

In another embodiment, the determination is based on a communication pattern or metric. For instance, individuals contacted on weekday mornings, with a call duration over twenty minutes, may merit an invitation to join the network. In another example, the top five individuals who are contacted the most by user 105 may merit an invitation to join the network.

At 330, suggested invitations to the network are generated. For example, invitation generator 150 generates a list of the most relevant contacts of user 105 to invite to use or register with the mobile video calling service.

At 340, a list of suggested invitations is presented. For example, a list of suggested invitations is displayed on display 270.

In one embodiment, at 345, selection of individuals in the presented list of suggested invitations is allowed. For example, user 105 is able to select which individuals in the presented list will be invited. In particular, referring to FIG. 2, two individuals are selected to be invited. It is understood that all or none of the individuals in the presented list can be invited.

At 350, a list of suggested invitations is automatically presented to the first user. For example, the suggested invitations, generated by invitation generator 150, are automatically presented to user 105.

At 360, the any of the plurality of individuals who merited the invitation to join the network with the first user are automatically invited. For example, the individuals who are deemed to have merited the invitations are automatically invited to join the network. In such an example, user 105 is not prompted to select which users are to be invited.

Various embodiments of the present invention are thus described. While the present invention has been described in particular embodiments, it should be appreciated that the present invention should not be construed as limited by such embodiments, but rather construed according to the following claims.

The invention claimed is:

1. A computer-implemented method for suggesting invitations to join a network, said computer-implemented method comprising:
   automatically accessing, by a computing system, a contact list stored on a first device and associated with a first user of a network, said contact list comprising information relating to a plurality of individuals, wherein said network is a mobile video calling service;
   comparing said information relating to said plurality of individuals with information relating to said first user;
   based on said comparing, determining, by said computing system, based on a call log, whether any of said plurality of individuals merit an invitation to join said network; and
   if a determination is made that said invitation to join said network is merited, then generating at least one suggested invitation to join said network; and
   presenting said at least one suggested invitation to said first user.

2. The computer-implemented method of claim 1, further comprising:
   obtaining said information relating to said first user of said network.

3. The computer-implemented method of claim 1, further comprising:
   automatically accessing a global contact list.

4. The computer-implemented method of claim 1, wherein said automatically accessing, by a computing system, a contact list stored on a first device and associated with a first user of a network comprises:
   accessing addressable information corresponding to said plurality of individuals.

5. The computer-implemented method of claim 1, wherein said information is selected from a group consisting of: name, phone number, email address, and Facebook ID.

6. The computer-implemented method of claim 1, wherein said determining is based on a communication pattern.

7. The computer-implemented method of claim 1, wherein said determining is based on a communication metric.

8. The computer-implemented method of claim 7, wherein said communication metric is selected from a group consisting of: duration of calls, time of calls, number of calls, location of calls, area code, and cost of calls.

9. The computer-implemented method of claim 1, further comprising:
   allowing selection of individuals of a presented list of suggested invitations.

10. The computer-implemented method of claim 1, further comprising:
    automatically presenting said at least one suggested invitation to said first user.

11. The computer-implemented method of claim 1, further comprising:
    automatically inviting any of said plurality of individuals who merited said invitation to join said network with said first user.

12. A computer useable storage medium having computer readable program code embedded therein, the program code comprising:
    an information accessor configured for automatically accessing a contact list stored on a first device and associated with a first user of a network, said contact list comprising information relating to a plurality of individuals, wherein said network is a mobile video calling service;
    an information comparor configured for comparing said information relating to said plurality of individuals with information relating to said first user;
    an invitation determiner configured for determining, based on said comparing and a call loq, whether any of said plurality of individuals merit an invitation to join said network;
    an invitation generator configured for, if a determination is made that said invitation to join said network is merited, generating at least one suggested invitation to join said network; and
    an invitation presenter configured for presenting said at least one suggested invitation to said first user.

13. The computer usable storage medium of claim 12, wherein said information accessor is further configured to access information corresponding to said first user of said network.

14. The computer usable storage medium of claim 12, further comprising:
    a display configured for presenting said at least one suggested invitation to said first user.

* * * * *

UNITED STATES PATENT AND TRADEMARK OFFICE
CERTIFICATE OF CORRECTION

| | | |
|---|---|---|
| PATENT NO. | : 8,738,714 B2 | Page 1 of 1 |
| APPLICATION NO. | : 13/184706 | |
| DATED | : May 27, 2014 | |
| INVENTOR(S) | : Eric Setton | |

It is certified that error appears in the above-identified patent and that said Letters Patent is hereby corrected as shown below:

In the Claims

Column 6, Claim 12, Line 47, Delete:    "loq"

Insert:    --log--

Signed and Sealed this
Thirteenth Day of January, 2015

Michelle K. Lee
*Deputy Director of the United States Patent and Trademark Office*